Dec. 9, 1969     K. W. BROWN     3,483,340
OVERLOAD DETECTOR FOR WIRE FEED SYSTEM
Filed June 2, 1967
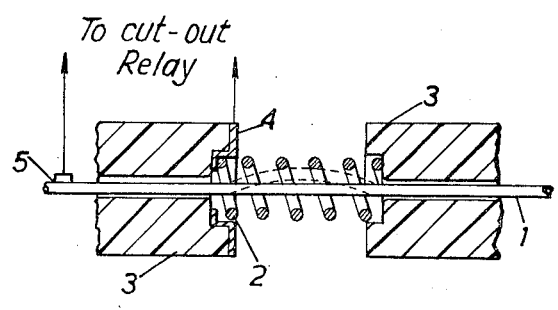

United States Patent Office 3,483,340
Patented Dec. 9, 1969

3,483,340
OVERLOAD DETECTOR FOR WIRE FEED SYSTEM
Kenneth W. Brown, Abington Hall, England, assignor to National Research Development Corporation, London, England, a British body corporate
Filed June 2, 1967, Ser. No. 643,227
Claims priority, application Great Britain, June 3, 1966, 24,844/66
Int. Cl. B65h 25/14, 25/00, 25/02
U.S. Cl. 200—61.18                              4 Claims

ABSTRACT OF THE DISCLOSURE

An overload detector apparatus is disclosed for use with a wire feed system. The detector includes a hollow tube which surrounds the wire being advanced. Insulating blocks provided at the inlet and outlet ends of the tube support the wire being fed and the tube proper includes a conductor connected in an electric circuit so that lateral displacement of the wire toward the conductor is detected and translated into an electrical signal.

---

In processes employing a continuously fed wire-like or strip-like member, an overload detector suitable for use with such a feed system comprises a hollow detector tube through which the wire-like or strip-like member is passed longitudinally. Insulating blocks at the inlet and outlet ends of the tube each include holes having a diameter substantially less than that of the tube and slightly greater than that of the member for the passage of the member, whereby the member is supported at the two ends of the tube, and the tube includes a conductor connected in an electric circuit such that lateral displacement of the member toward the conductor is detected and translated into an electrical signal. In welding processes the signal may subsequently be used to switch off the wire feed supply to prevent wire jamming or to warn the operator that the resistance to feed has built up to an abnormal level and that, for example, the contact tip requires replacement.

The hollow detector tube preferably comprises a hollow conductor which together with the wire forms a switch in the electrical circuit such that the switch is closed only when the lateral displacement is great enough for the wire to physically touch the walls of the conductor.

The hollow conductor may be a coiled spring inset into the faces of the block. These faces are coated with a conductive material and the spring bears up against this material to make a permanent electrical contact. Thus the sensitivity of the device can easily be adjusted by moving the blocks toward and away from one another to alter the buckling length of the wire. A small axial compressive strain along the wire, which would result from a restriction to the normal feeding of the wire, produces a relatively large deflection displacement sideways along that portion of the wire which is free to bend i.e. the portion between the blocks. The degree of restriction required to deflect the wire sufficiently to make it contact the spring will depend largely on the wire stiffness. For very stiff wires the insulating blocks would therefore be set well apart to achieve the maximum effect from a given restriction. Alternatively hollow conductors of varying internal diameter may provide stepped degrees of sensitivity, and accommodation for these can readily be made on the insulating blocks. Various wire diameters can also be accommodated by expanding or contracting the holes in the insulating blocks.

In a case where the wire does not necessarily have to touch the walls of the detector tube to produce a signal, the wire may form one electrode of a capacitor or the coiled spring may comprise an inductor. The signal then results from lateral displacement of the wire producing a change of capacitance or inductance, respectively, in the electrical circuit.

The deflection detector can be used, for example, in any welding system in which an electrode wire or a filler wire is fed towards the arc.

One example of the invention is shown in the accompanying drawing in which the single figure shows a typical overload detector in accordance with the present invention.

In the drawing a consumable electrode wire 1 is fed through a coiled metal spring 2 and is supported at either end by the insulating blocks 3 which may be made from nylon. One block has a face coated with a metal contact 4 with which the spring makes a permanent electrical contact. The metal contact is connected to one side of an electrical circuit, the other side of which is permanently connected to the wire through the brush contact 5. The circuit will therefore only be completed when the wire meets a restriction or blockage in the welding gun which will cause the wire to bend laterally and touch the spring. The resultant electrical signal actuates a cut-out relay which cuts off the power supply and wire feed.

The speed at which the device responds to a restriction or blockage depends largely on the physical dimensions and the material of the elements comprising the device and on the speed of feeding the wire. When feeding the wire at 300 inches per minute, using a 1″ wire spring having an internal diameter of 0.238″, we obtained a response time of 14 milliseconds. At 500 inches per minute with a 2″ wire spring, the response time was 4.5 milliseconds.

I claim:
1. Apparatus for the continuous advancement of a wire-like or strip-like member along a predetermined feed path including detector means responsive to a blockage or restriction of the feed to produce an electrical detection signal, the detector means comprising a hollow detector tube; insulating blocks at the inlet and outlet ends of the tube, each block including a hole having a diameter substantially less than that of the tube and only slightly greater than that of the member for the passage of the member, whereby the member is supported at both ends of the tube; and the tube including a conductor connected in an electrical circuit such that lateral displacement of the member toward the conductor is detected and translated into an electrical signal.

2. Apparatus for feeding a consumable wire into a welding process including detector means responsive to a blockage or restriction of the wire feed to produce an electrical detection signal, the detector means comprising: a hollow detector tube; insulating blocks at the inlet and outlet ends of the tube, each block including a hole having a diameter substantially less than that of the tube and only slightly greater than that of the wire for the passage of the wire, whereby the wire is supported at both ends of the tube; and the tube including a conductor connected in an electrical circuit such that lateral displacement of the wire toward the conductor is detected and translated into an electrical signal.

3. Apparatus according to claim 2, in which the detector tube comprises a hollow conductor, the wire and the walls of the tube forming a switch in the electrical circuit, the switch being closed when the lateral displacement of the wire is great enough to bring the wire into contact with the walls.

4. Apparatus according to claim 3, in which the detector tube comprises a coiled spring whereby the sensitivity of the apparatus may be adjusted by varying the distance between the insulating blocks.

References Cited
UNITED STATES PATENTS

| | | | |
|---|---|---|---|
| 2,685,626 | 8/1954 | Zwack | 200—61.18 X |
| 2,702,326 | 2/1955 | Bodmer | 200—61.18 |

M. HENSON WOOD, Jr., Primary Examiner

R. A. SCHACHER, Assistant Examiner

U.S. Cl. X.R.

226—25, 45